United States Patent
Oldiges et al.

(10) Patent No.: US 9,227,545 B1
(45) Date of Patent: Jan. 5, 2016

(54) SELF-PROPELLED DUMP TRAILER WITH SEPARATOR GATE

(71) Applicant: AXIS CORPORATION, Bellefontaine, OH (US)

(72) Inventors: Matthew C. Oldiges, Anna, OH (US); Thomas N. Oldiges, Bellefontaine, OH (US)

(73) Assignee: AXIS CORPORATION, Bellefontaine, OH (US)

( * ) Notice: Subject to any disclaimer, the term of this patent is extended or adjusted under 35 U.S.C. 154(b) by 7 days.

(21) Appl. No.: 14/314,140

(22) Filed: Jun. 25, 2014

(51) Int. Cl.
 *B60P 1/16* (2006.01)
 *B60P 1/04* (2006.01)
 *B62D 59/04* (2006.01)

(52) U.S. Cl.
 CPC . *B60P 1/16* (2013.01); *B60P 1/045* (2013.01); *B62D 59/04* (2013.01)

(58) Field of Classification Search
 CPC .......... B60P 1/16; B60P 1/045; B62D 59/042
 USPC ................. 298/1 C, 2, 5, 6, 22 R, 23 R, 17 S; 180/19.1, 19.2, 19.3, 211; 280/47.24
 See application file for complete search history.

(56) References Cited

U.S. PATENT DOCUMENTS

| | | | |
|---|---|---|---|
| 611,082 A | 9/1898 | Shadbolt | |
| 730,607 A | 6/1903 | Brown | |
| 2,260,504 A | 10/1941 | Barrett | |
| 2,919,953 A | 1/1960 | Gruhlkey | |
| 3,058,779 A | 10/1962 | Pietroroia | |
| 3,092,273 A | 6/1963 | Schramm | |
| 4,589,508 A | 5/1986 | Hoover et al. | |
| 4,691,956 A | 9/1987 | Hodge | |
| 4,811,988 A * | 3/1989 | Immel | B62B 3/08 298/2 |
| 5,267,779 A | 12/1993 | Talamantez, Jr. et al. | |
| 6,092,863 A | 7/2000 | Hagenbuch et al. | |
| 6,817,677 B1 | 11/2004 | Beiler | |
| 7,878,751 B2 | 2/2011 | Hagenbuch | |
| 8,220,874 B2 | 7/2012 | Heider et al. | |
| 2012/0291319 A1 | 11/2012 | Jones | |
| 2013/0034422 A1 | 2/2013 | Warburton | |

FOREIGN PATENT DOCUMENTS

CN    201321099 Y    10/2009

OTHER PUBLICATIONS

James D. Julia, Inc., "Outstanding Scale Model of the Autocar Military Transport Vehicle", http://jamesdjulia.com/auctions/view_lot_info.asp?lot=3257-335, Nov. 27, 2012.

* cited by examiner

Primary Examiner — Stephen Gordon
(74) Attorney, Agent, or Firm — Thomas E. Lees, LLC

(57) ABSTRACT

A self-propelled dump trailer comprises a frame, a first wheel driven by an engine, a second wheel, a steering mechanism, and a dump bed that may have its front end elevated by a lifting mechanism. The frame includes a coupler so the dump trailer can be selectively coupled to a vehicle and uncoupled from the vehicle. Further, the dump bed includes a rear gate and a separator gate that divides the dump bed into two sections, wherein the separator gate is operable to place the dump bed into a first dumping position and a second dumping position. As such, the forward section of the dump bed acts as a counterbalance during a dumping operation.

17 Claims, 4 Drawing Sheets

SELF-PROPELLED DUMP TRAILER WITH SEPARATOR GATE

BACKGROUND

The present invention relates in general to dump trailers and more specifically to self-propelled trailers.

A self-propelled dump trailer is used for various applications including hauling soil or aggregate and collecting large, bulky waste from residences. Once at a site, the self-propelled dump trailer does not require a towing vehicle to move around, nor does it require that a user exert force to move. Because the self-propelled dump trailer does not require a towing vehicle, it is suited for travel over mowed-grass areas (e.g., a lawn, cemetery, golf course, etc.). Further, the self-propelled dump trailer has a tighter turning radius than a towed dump trailer, which allows for more maneuverability at the site.

BRIEF SUMMARY

According to aspects of the present invention, a self-propelled dump trailer comprises a frame, at least two wheels (at least one of which is driven by an engine), a steering mechanism, and a dump bed that may have its front end elevated by a lifting mechanism. The frame includes a coupler so the dump trailer can be selectively coupled to a vehicle and uncoupled from the vehicle. Further, the dump bed includes a rear gate and a separator gate that divides the dump bed into two sections, wherein the separator gate is operable to place the dump bed into a first dumping position and a second dumping position. As such, the forward section of the dump bed acts as a counterbalance during a dumping operation.

DETAILED DESCRIPTION

According to various aspects of the present invention, a dump trailer includes a dump bed separated into a forward section and a rear section by a separator gate. Thus, if the separator gate is closed and the dump bed is in a dumping position, only the contents from the rear section are dumped, while the contents of the forward section of the dump bed remain secured in the forward section by the separator gate. As such, when the dump trailer dumps before the separator gate is released, the contents of the forward section act as a counterbalance to prevent the dump trailer from tipping over. When the separator gate is released, the contents of the forward section travel through the rear section and are dumped. Therefore, the materials for dumping act as a counterbalance, so there is no need to add a permanent counterbalance to the dump trailer itself.

Figure 1:
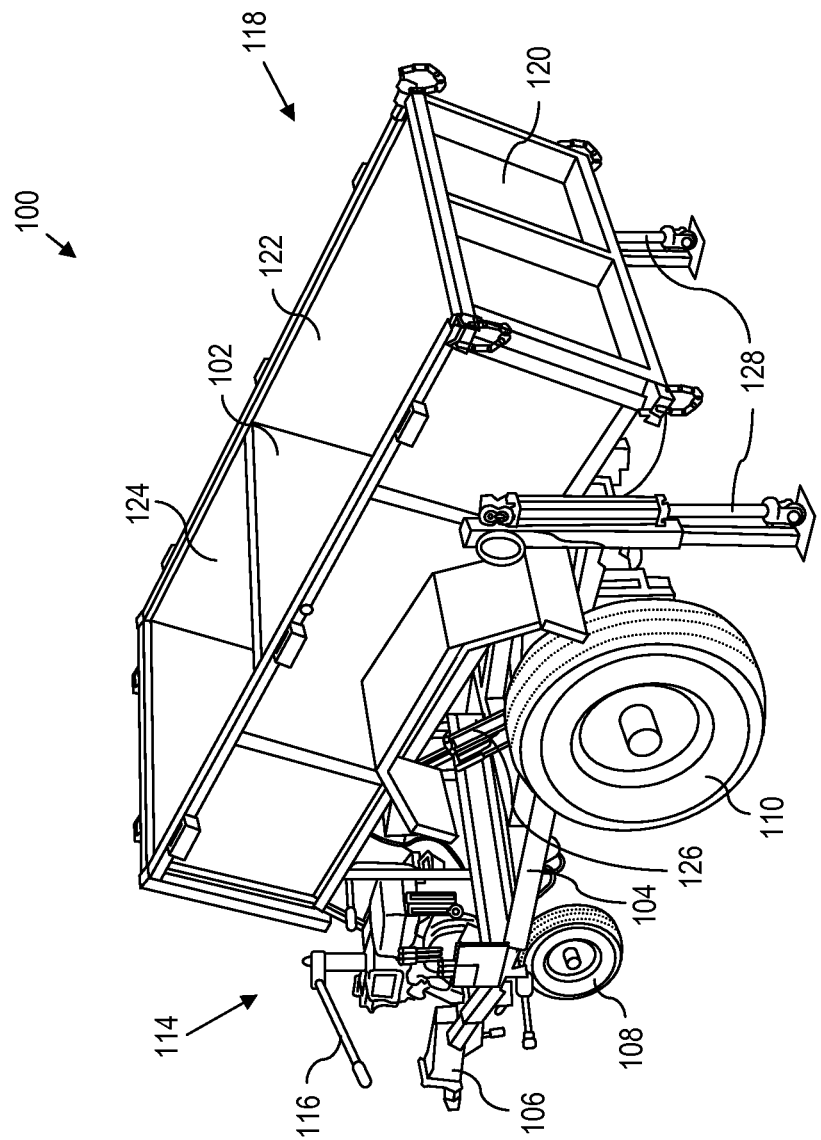
FIG. 1 is an illustration showing a self-propelled dump trailer with a separator gate that separates a dump bed into two sections, according to various aspects of the present disclosure.

Turning to FIG. 1, a self-propelled dump trailer 100 with a separator gate 102 is shown. Basically, the self-propelled dump trailer 100 includes a frame 104 with a coupler 106 that allows the dump trailer 100 to be coupled to a vehicle for towing. When the dump trailer needs to be moved from a first site to a second site over roads, the dump trailer 100 is coupled to a vehicle that will tow the dump trailer 100 to the second site. The coupler 106 can be any type of coupler (e.g., pintle hook, ball-type receiver, Janney coupler, etc.) that couples the dump trailer 100 to a vehicle for towing.

As described herein, the forward portion of the dump trailer 100 is toward the coupler 106, and the rear portion of the dump trailer 100 is away from the coupler 106. The dump trailer 100 of FIG. 1 further includes a forward wheel 108 and a set of rear wheels 110. However, there may be two forward wheels and one rear wheel, or there may be two forward wheels and two rear wheels. Basically, any number and combination of wheels may be used (e.g., two rear and zero forward, one rear and one forward, etc.). Further, any type of tires may be used on the wheels, but the type of tires does not have to be identical between the wheels (e.g., the rear wheels may include balloon tires and the forward wheels may include tubeless tires).

In further reference to FIG. 1, the forward wheel 108 may be retractable. For example, the forward wheel 108 may be coupled to the frame 104 via a post (not shown) that may be moved up and down. As such, when the dump trailer 100 is coupled to a vehicle, the post may be moved up such that the forward wheel 108 does not touch the ground during towage. However, when the dump trailer 100 is uncoupled from the vehicle, the post can be lowered to allow the forward wheel 108 to touch the ground properly to allow for the self-propelled dump trailer 100 to move. The mechanism that raises and lowers the post may be any suitable mechanism such as, but not limited to, a crank and gear, a hinge that allows the post to fold to and away from the frame, a pin and détente structure, etc.

Moreover, the self-propelled dump trailer 100 includes an engine 114, which drives at least one of the wheels 108, 110. For example, the engine 114 may drive one or both of the rear wheels 110, one or more forward wheels 108, or combinations thereof. Further, the engine 114 may be any suitable engine (e.g., unleaded gasoline, diesel, electric, etc.) to power the driven wheel. As such, when the self-propelled dump trailer 100 is at a general site, the self-propelled dump trailer may be moved to specific points at the site under its own power (i.e., self-propelled), and a user uses a steering mechanism 116 to steer the self-propelled dump trailer 100 to the specific location at the site. A shown, the steering mechanism 116 is a bar, but other steering mechanisms may be used (e.g., wheel, yoke, etc.).

Further, the dump trailer 100 includes a dump bed 118 including a rear gate 120 at the rear of the dump bed 118 and the separator gate 102 disposed between the rear gate 120 and a front of the dump bed 118, creating two sections of the dump bed 118—a rear section 122 and a forward section 124. As shown in FIG. 1, the rear gate 120 is hinged at the top and when the bottom of the rear gate 120 is unsecured, the rear gate 120 may pivot around the top. However, the rear gate 120 may be released in other ways (e.g., hinged at the bottom, hinged on a side, lifted up, slid to either side, hinged on both sides with a separation in the middle, etc.). The operation of the rear gate 120 is discussed in more detail below in reference to FIGS. 3-5, and the operation of the separator gate is discussed in greater detail below in reference to FIGS. 2-5.

To place the dump bed 118 in a dumping position, a lifting mechanism 126 lifts a front portion of the dump bed 118 such that the dump bed 118 rotates around a point (e.g., the rear of the dump bed, an end of the frame 104, etc.). The dumping process is discussed in greater detail below in reference to FIGS. 3-5. In the embodiment of FIG. 1, the lifting mechanism 126 is a hydraulic lifting mechanism. However, the lifting mechanism 126 may be any suitable mechanism (e.g., electric, pneumatic, etc.). As with the self-propulsion aspect of the present invention, the lifting mechanism 126 may be powered by the engine 114. However, the lifting mechanism 126 may be powered by a separate power source (e.g., another engine, battery, etc.) or a combination of the engine 114 and the separate power source (not shown).

To help aid in stabilizing the self-propelled dump trailer 100 during a dumping process, stabilizers 128 may be placed on the dump trailer 100. When the dump trailer 100 reaches its dumping destination, the stabilizers 128 may be extended to stabilize the dump trailer 100. When the dumping process is finished and the dump bed 118 returned to its generally horizontal position, the stabilizers 128 may be retracted so the dump trailer 100 may easily move again. As shown in FIG. 1, the stabilizers 128 couple to the dump bed 118. However, the stabilizers 128 may be coupled directly to the frame 104. Further, the stabilizers 128 should be closer to the rear of the dump trailer 100 than the rear wheels 110.

Figure 2:
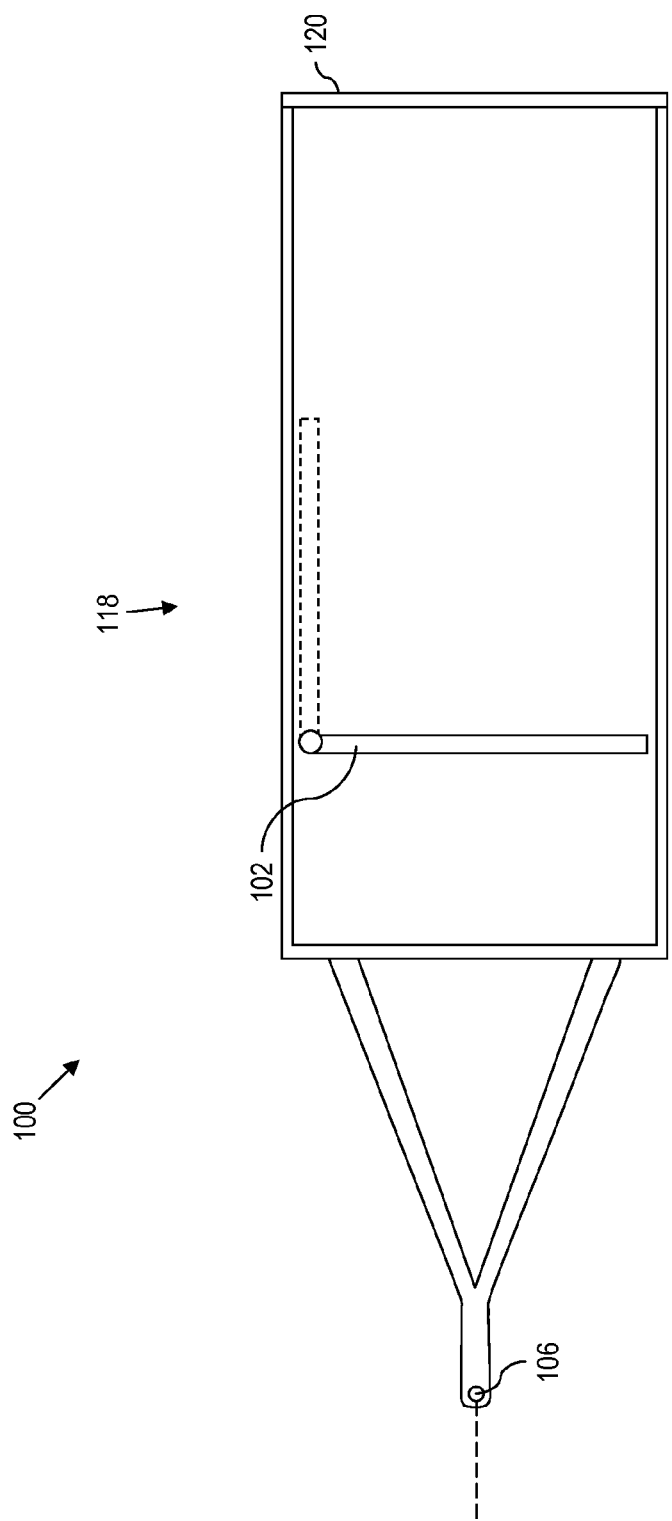
FIG. 2 is a simplified top view of a self-propelled dump trailer, according to various aspects of the present disclosure.

Turning now to FIG. 2, a simplified top view of the self-propelled dump trailer of FIG. 1 is shown. The simplified view of FIG. 2 does not illustrate all of the features of the self-propelled dump trailer of FIG. 1 like the engine, the steering mechanism, the wheels, etc. As discussed above, the dump bed 118 includes both a rear gate 120 and a separator gate 102.

In the embodiment of FIG. 2, the separator gate 102 is about one-quarter of the way dwn the dump bed 118 from the front end of the dump bed, but the separator gate 102 may be in other positions instead. However, the position of the separator gate 102 is related to a pivot point of the dump trailer 100. In a dump trailer without stabilizers, the pivot point of the dump trailer is the point at which the rear wheels touch the ground, and in a dump trailer with stabilizers, the pivot point is the point at which the stabilizers touch the ground. For instance, when the dump bed 118 is in a generally horizontal position, the separator gate 102 should be between the coupler 106 and the pivot point (on a horizontal line). Further, when the dump bed 118 is in a dumping position, the separator gate 102 should remain between the front of the dump bed 118 and the pivot point (on the horizontal line) even though the separator gate 102 will have traveled closer to the pivot point (along the horizontal line) when the front of the dump bed 118 is elevated by the lifting mechanism. Thus, the position of the separator gate is dependent on the distance between the pivot point and the front of the dump bed and dependent on the angle at which the dump bed will be when in the dumping position.

As shown in FIG. 2, the separator gate 102 is hinged on a side. Thus, the separator gate 102 is allowed (or forced) to swing open along the side with the hinge. However, the separator gate may be opened in other ways including but not limited to: a hinge on the top of the separator gate, a hinge on the bottom of the separator gate, lifting the separator gate up a sliding mechanism, sliding the separator gate sideways (i.e., horizontal-sliding) along a sliding mechanism, etc.

Figure 3:
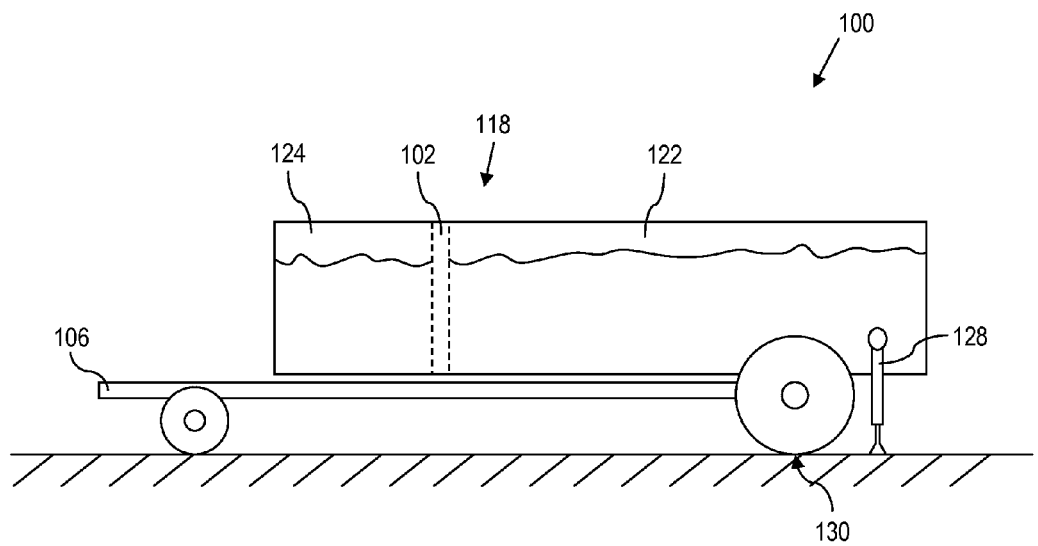
FIG. 3 is a simplified side view of a dump trailer where the dump bed is in a generally horizontal position, according to various aspects of the present disclosure.
Figure 4:
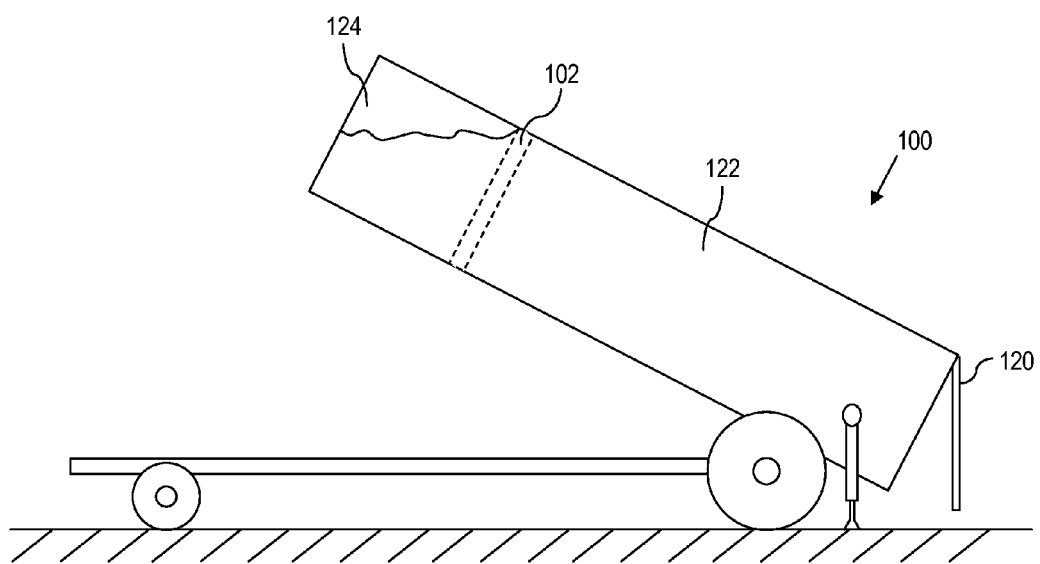
FIG. 4 is a simplified side view of the dump trailer of FIG. 3 where the dump bed is in a first dumping position such that a forward section of the dump bed acts as a counterbalance during a dumping operation, according to various aspects of the present disclosure.
Figure 5:
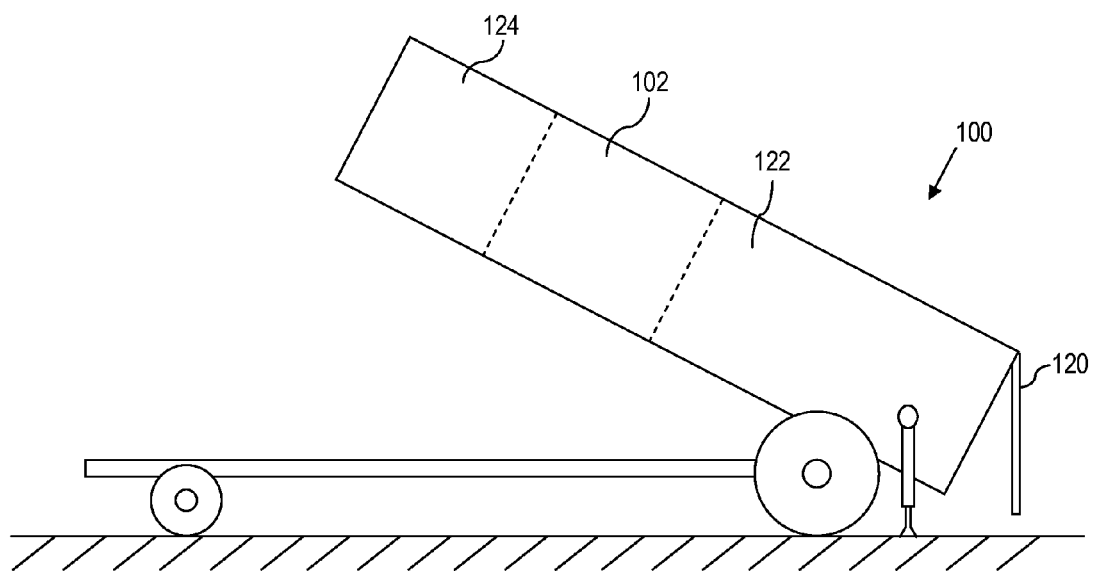
FIG. 5 is a simplified side view of the dump trailer of FIGS. 3-4 where the dump bed is in a second dumping position (i.e., a separator gate is released) such that contents of the forward section of the dump bed are allowed to leave the dump bed, according to various aspects of the present disclosure.

FIGS. 3-5 show simplified side views of the dump trailer during different stages of a dumping process. FIG. 3 shows the dump trailer 100 in a generally horizontal position. Materials for dumping fill both the forward section 124 and the rear section 122 of the dump bed 118. The stabilizers 128 are extended and create a pivot point 130 for the dump trailer on the ground. Note that the separator gate 102 is between the coupler 106 and the pivot point 130 along a horizontal line.

FIG. 4 shows the dump trailer 100 in a first dumping position. The rear gate 120 is hinged on the top and has been unlatched. Thus, when the dump bed 118 is placed in the first dumping position, the materials from the rear section 122 of the dump bed 118 pour out of the rear of the dump bed 118 through the open rear gate 120. However, the materials in the forward section 124 remain in the forward section 124 when the dump bed is in the first dumping position.

Because the separator gate 102 remains between the pivot point 130 and the coupler, the load of the material in the forward section 124 produces a counterclockwise torque on the dump trailer 100 around the pivot point. This counterclockwise torque acts as a counterbalance when the material from the rear section 122 passes past the pivot point and produces a clockwise torque around the pivot point 130. As such, the dump trailer will not tip over around the pivot point 130 during the dumping process. Therefore, there is no need to add an extra weight as a counterbalance to the dump trailer 100, which allows the self-propelled dump trailer 100 to be lighter overall than standard self-propelled dump trailers. Further, this lighter dump trailer 100 will leave less deep tracks/ruts (or no tracks/ruts at all) in the ground when being moved at a site. Further, the dump trailer 100 does not need to be hitched to a towing vehicle that acts as a counter weight. Instead, the dump trailer 100 is stand-alone at the site.

Turning now to FIG. 5, the dump trailer 100 is shown in a second dumping position, where the separator gate 102 is released. The materials from the forward section 124 pass through the rear section 122 and out the opened rear gate 120. Therefore, all of the materials in the dump trailer may be removed through the opened rear gate 120.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A self-propelled dump trailer comprising:
   a frame including a coupler such that the dump trailer may be selectively coupled to a vehicle and uncoupled from the vehicle;
   a first wheel coupled to the frame;
   a second wheel coupled to the frame;
   an engine coupled to the frame and mechanically coupled to the first wheel such that the engine drives the first wheel;
   a steering mechanism coupled to the frame;
   a dump bed coupled to the frame, the dump bed comprising:
      a rear gate; and
      a separator gate that divides the dump bed into two sections, wherein the separator gate is operable to place the dump bed into a first dumping position and a second dumping position; and
   a lifting mechanism for elevating a front portion of the dump bed.

2. The self-propelled dump trailer of claim 1, wherein the separator gate is hinged on a side.

3. The self-propelled dump trailer of claim 1, wherein the separator gate is hinged on a top of the separator gate.

4. The self-propelled dump trailer of claim 1, wherein the separator gate is hinged on a bottom of the separator gate.

5. The self-propelled dump trailer of claim 1, wherein the separator gate is a lift gate.

6. The self-propelled dump trailer of claim 1, wherein the separator gate is a horizontal-sliding gate.

7. The self-propelled dump trailer of claim 1, wherein the first wheel is toward the rear of the frame.

8. The self-propelled dump trailer of claim 7, wherein the second wheel is retractable.

9. The self-propelled dump trailer of claim 1, wherein the first wheel is toward the front of the frame.

10. The self-propelled dump trailer of claim 1, wherein the rear gate opens via a hinge.

11. The self-propelled dump trailer of claim 1, wherein the rear gate opens via a sliding mechanism.

12. The self-propelled dump trailer of claim 1, wherein lifting mechanism is a hydraulic lifting mechanism.

13. The self-propelled dump trailer of claim 1 further comprising a stabilizer on the frame.

14. The self-propelled dump trailer of claim 1 further comprising a stabilizer on the dump bed.

15. The self-propelled dump trailer of claim 1 further comprising a balloon tire on the first wheel.

16. The self-propelled dump trailer of claim 1 further wherein the steering mechanism is coupled to the first wheel such that a user can steer the self-propelled dump trailer.

17. The self-propelled dump trailer of claim 1 further wherein the steering mechanism is coupled to the second wheel such that a user can steer the self-propelled dump trailer.

* * * * *